Jan. 4, 1938.  L. P. PENNELL ET AL  2,104,546
CONVEYER SCALE
Filed Nov. 27, 1934  2 Sheets-Sheet 1
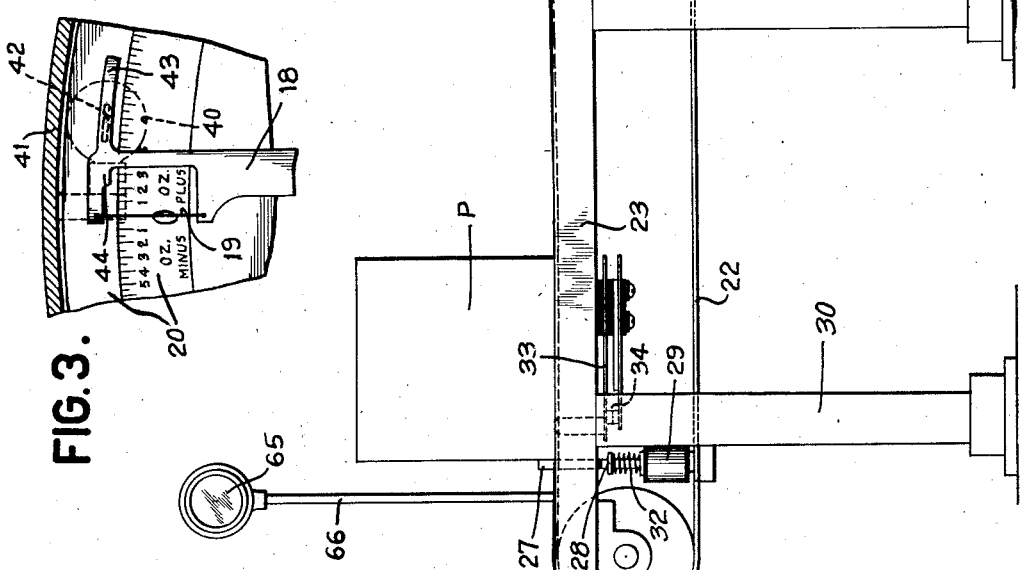
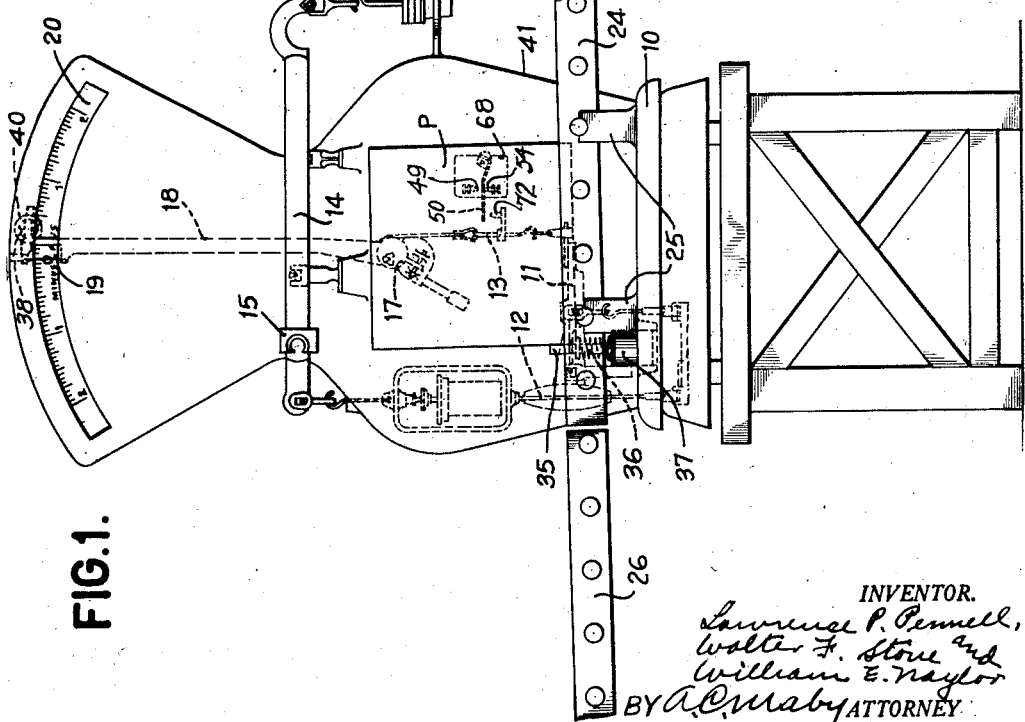
INVENTOR.
Lawrence P. Pennell,
Walter F. Stone and
William E. Naylor
BY A. C. Maby ATTORNEY

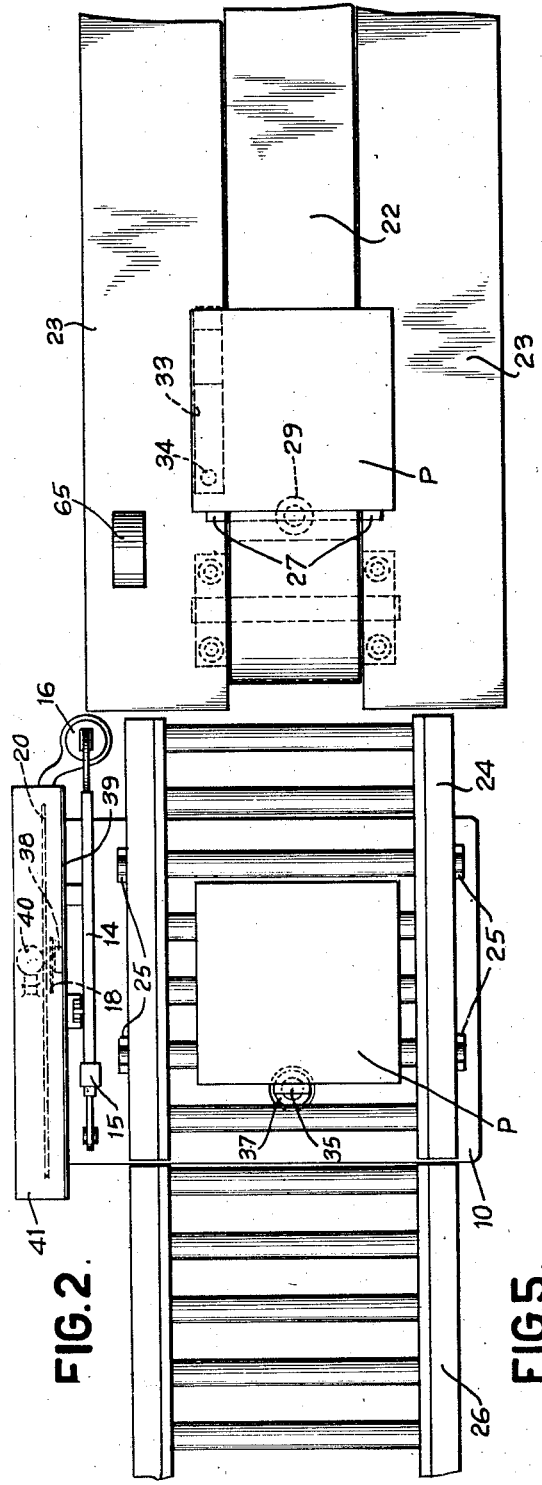
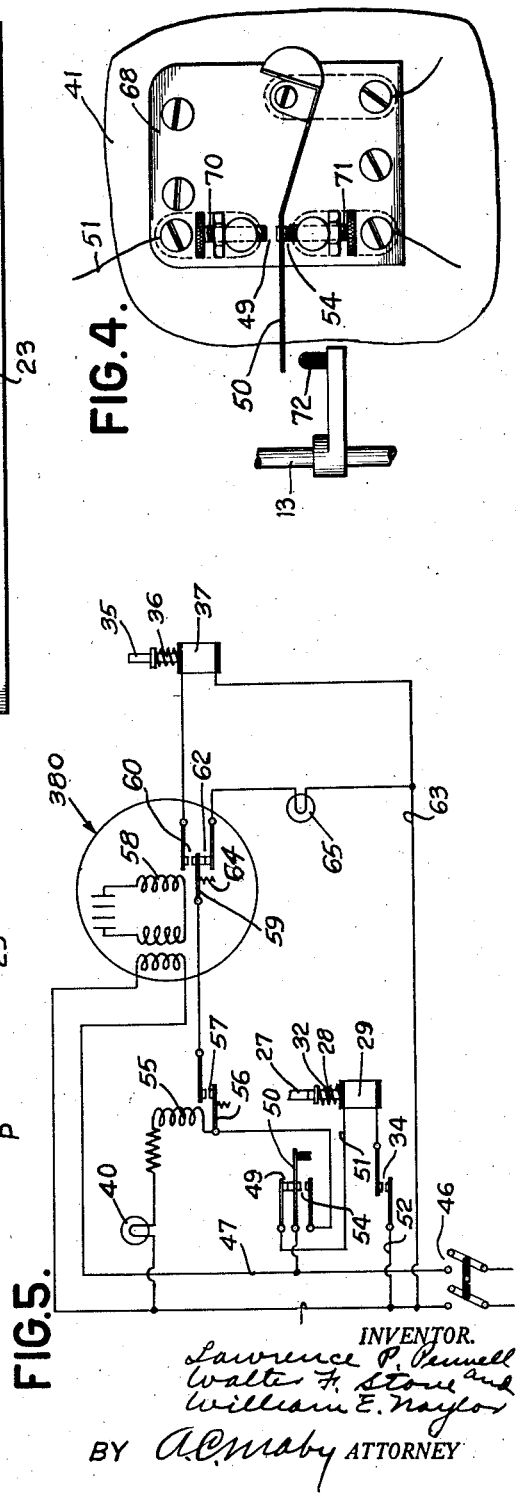

Patented Jan. 4, 1938

2,104,546

UNITED STATES PATENT OFFICE 2,104,546

CONVEYER SCALE

Lawrence P. Pennell and Walter F. Stone, Chicago, Ill., and William E. Naylor, Binghamton, N. Y., assignors to International Business Machines Corporation, New York, N. Y., a corporation of New York Application November 27, 1934, Serial No. 754,946

13 Claims. (Cl. 209—121)

This case relates to a package conveying system including weighing means to reject all packages except those of a specified weight.

The object is to provide simple means for controlling the advance of a package in accordance with its weight.

More specifically, the object is to provide a control for the advance of the package which operates without frictional or retarding effect on the weighing means.

Further, the object contemplates delaying effective control of the package feed until the weighing mechanism has been given time to fully respond to the weight of the package.

Still further, the object is to provide a stop on the scale platform to impede advance of the object unless the latter is of standard, specified, weight.

Another object is to prevent interference between two packages by an intercontrol between the package on the platform and the succeeding package on the conveyer system.

Other objects will be clear from the description, claims, and drawings.

Fig. 1 is a front view of the conveyer system including the weighing scale,

Fig. 2 is a plan view of the same,

Fig. 3 is a detail of the control governing package advance,

Fig. 4 is a detail of the load and no load switches of the scale, and

Fig. 5 is a circuit diagram.

The scale may be of any suitable type but for the present purposes, the one disclosed in Patent No. 1,516,033 has been chosen.

Platform 10 carries the load and acts through base levers (not shown) to depress draft rod 12 and through lever 11 to likewise depress rod 13. Draft rod 12 is connected to an intermediate beam 14 carrying a poise 15 and hanging weight 16. Draft rod 13 is connected to the pendulum 17 the hub of which carries an index hand 18 with a hair line 19 for indexing the weight. The hair line traverses a chart 20 which has a zero indication in the center and under and over ounce graduations and indications at opposite sides of the zero indication. Preliminarily, the poise 15 and hanging weight 16 are adjusted to bring hair line 19 to the zero mark of chart 20 when a package of specified weight is on platform 10. If the package is below specified weight, the hair line moves to the left of the zero mark (as viewed in Fig. 3) and if the package is above specified weight, the hair line moves to the right of the zero mark. The scale being of the automatic counterbalance and indicating type, the indicator will rest at different positions of equilibrium corresponding to the weight of the package on the platform.

Conveying the packages P to the scale is a belt 22 which may run continuously. The belt lies between two stationary tables 23, the forward ends of which are in line with the rear and higher end of a downwardly inclined roller conveyer section 24 which is supported on legs 25 extending upwardly from platform 10. Section 24 forms an auxiliary load support or superimposed platform. In line with the lower, forward end of section 24 is the downwardly inclined conveyer section 26.

Disregarding the weighing control, for the moment, the package P is fed by belt 22 onto platform section 24. The package then moves by gravity down the inclined sections 24 and 26.

Projecting through slots in tables 23 are a pair of stops 27 which are the spaced branches of a Y-shaped armature 28, the stem of which forms the core of a solenoid 29 secured to the frame 30. Spring 32 normally holds the armature in upper position with stops 27 operative to engage the package and block its advance to platform section 24. Preceding stops 27, one table 23 carries a pair of light spring contact blades 33 which are provided with normally open coacting contact points 34. Thus, the package P will be fed by belt 22 until it engages stops 27, in which position the package will act on the upper blade 33 to close contacts 34. When there is no load or package on the scale, a circuit will be completed through the solenoid 29 and switch 34 to energize the solenoid and lower the stops 27, thus permitting the belt to convey the package to platform section 24. This circuit will be described later in connection with the circuit diagram.

The package conveyed to platform section 24 slides down this section until it abuts a normally raised stop member 35. Member 35 is part of a core 36 of a solenoid 37 carried by platform 10. The package when abutting stop member 35 is in proper weighing position. In accordance with its weight, this package moves index hand 18 along chart 20. Should the package be of predetermined specified weight, hair line 19 will stand at "0" on the chart.

It is not necessary, in the present application of the invention, to weigh the packages to a greater accuracy than + or —3 ounces from the standard or specified weight. Accordingly, should the package be within this tolerance, then by means presently to be described, solenoid 37 will be energized to lower stop member 35 and permit the package to slide off platform section 24 and down conveyer section 26. Should the package be of a weight greater than 3 ounces above or less than 3 ounces below the specified weight, then solenoid 37 will not be energized and stop 35 will remain in position to block advance of the package. The latter is then removed by hand and placed in the rejected group.

The control of solenoid 37 is exercised by a photo cell or electric eye 38 which is located behind chart 20 and inside the scale frame and housing 41 and is shielded against reception of light from a lamp 40 carried by the scale frame 41 in front of chart 20 except through an elongated opening 42 in the chart. Index hand 18, at its upper end is formed with opaque transverse extensions 43 and 44. When the hand 18 is in zero or correct balance position, then the extensions 43 and 44 mask opening 42 and block the light from lamp 40 so that the cell 38 remains darkened. For a movement of hand 18 corresponding to 3 ounces under weight, extension 43 keeps opening 42 covered and for a movement of the hand corresponding to 3 ounces over weight, extension 44 masks opening 42. Beyond these limits, the extensions expose opening 42 permitting passage of light from lamp 40 to cell 38 to energize the latter. Energization of the cell prevents energization of solenoid 37 causing stop member 35 to remain in upper blocking position and incidentally causes a signal to function for indicating that the package on the platform should be removed by hand because it is not of the proper weight.

The cooperation of the various parts will now be explained in connection with the circuit diagram, Fig. 5.

With main switch 46 closed, power is supplied to lines 47 and 48. Assume that a package is in position against stops 27 and that there is no package on the platform. Switch 34 will be closed by this package and a normally closed no-load switch 49 in the scale will also be closed. Under these conditions, the following circuit is formed:

*Circuit A.*—From power line 47, through switch blade 50, normally closed switch 49, line 51, solenoid 29, switch 34 (now closed), and line 52, to power line 48.

As a result of this circuit, solenoid 29 is energized and attracts its core 28 to lower stops 27 out of the path of the package which is thereupon moved onto platform section 24. As soon as this occurs, no-load switch 49 opens and load switch 54 closes. (The switches 49 and 54 and their operating mechanism will be later described.) As switch 49 is now open, the above circuit is broken and stops 27 return to active position to prevent the succeeding package on the conveyer from moving onto the scale until the platform section 24 is again cleared.

With the closing of switch 54, the following circuit is formed:

*Circuit B.*—From power line 47, through switch blade 50, switch 54, delayed time relay 55, and lamp 40, to power line 48.

After a lapse of time, relay 55 is sufficiently energized by above circuit to attract its armature 56 to close contacts 57. The relay 55 is designed to delay closing of contacts 57 until the weighing mechanism operated by the package on the platform section 24 has had sufficient time to come to rest.

If the package is of specified weight within a tolerance of ±3 ounces, then, as previously explained, photo cell 38 will remain dark. The photo cell circuit is so designed that with the cell dark, the control relay 58 of the photo cell-controlled assembly 380 is energized. Consequently, armature 59 is attracted to close contacts 60 and open contacts 62. With contacts 54, 57, and 60 closed, the following circuit is made:

*Circuit C.*—From power line 47, through blade 50, switch 54, contacts 57, contacts 60, solenoid 37, and line 63 to power line 48.

Solenoid 37 is energized by above circuit to lower stop member 35 out of the path of the package on the platform section 24, permitting the package to slide off this section and onto the conveyer section 26. The platform section now being clear, switch 54 will open and switch 49 close, thus again establishing circuit A to cause the next package to be moved to the platform section.

Should this package vary from the specified weight by more than ±3 ounces, then photo cell 38 will receive rays of light from lamp 40 and be energized. As a result, the current through relay 58 will be insufficient to energize the relay and spring 64 will move armature 59 to open contacts 60 and close contacts 62.

Due to opening of contacts 60, circuit C cannot be completed, and as a result, solenoid 37 remains inert and stop member 35 prevents resumption of the feed of the package from platform section 24 to conveyer section 26. The package must then be removed by hand.

To furnish the operator, who may be stationed at a distance from the scale, with a signal indicating that the package is not of passing weight and must be manually removed, the closing of contacts 62 forms the following circuit:

*Circuit D.*—From power line 47, through blade 50, switch 54, contacts 57, contacts 62, signal 65, and line 63, to power line 48.

Signal 65 may be of the visual type, such as a red lamp, or of the audible type, such as a buzzer. Reference to Figs. 1 and 2, shows the mounting of the signal on a post 66 carried by a table 23.

Reference to Fig. 4 shows the double throw switch in the scale. Fixed in the interior of the scale to frame 41 is a bracket 68 of bakelite material and to which the light switch blade 50 is pivoted. Switch blade 50 on its upper face carries one of the contacts 49 and on its lower face carries one of the contacts 54. The other contacts 49 and 54 are provided on the tips of screws 70 and 71 which are adjustably carried by bracket 68. With the scale unloaded, blade 50 is maintained in upper position by a bakelite finger 72 secured to draft rod 13. In this position, contact 49 on the blade 50 engages contact 49 on screw 70. As soon as any load is placed on the scale, rod 13 descends and blade 50 drops, thereby separating contacts 49 and engaging its contact 54 with the contact 54 on screw 71.

Briefly summarized, the operation is as follows:

The belt 22 advances a package P to abut stops 27. In this position the package closes contacts 34. If the scale is unloaded at the time, contacts 49 are closed and circuit A makes to energize solenoid 29. Stops 27 thereupon drop and the package is advanced to the inclined platform section 24. The package slides down section 24 until stopped by abutment 35. With the package on the platform section, contacts 49 open and contacts 54 close to establish circuit B in which delay time relay 55 is included. After a lapse of time sufficient to permit the scale to come to rest under the load, relay 55 operates to close contacts 57. If the package is of proper weight, then photo cell 38 is darkened and relay 58 energized to close contacts 60, thus forming circuit C. This circuit energizes solenoid 37 to move abutment 35 to ineffective position, permitting the package to automatically slide from platform section 24 to conveyer section 26.

If the package is not of proper weight, cell 38 is energized and relay 58 deenergized. As a result contacts 60 open, preventing formation of circuit C and contacts 62 close to establish signal circuit D which energizes a signal 65 to indicate to the operator that the package is not of proper weight and must be manually removed from the scale.

While the invention has been disclosed in one of its forms, it is to be understood that the following claims are intended to cover other forms, variations, changes, and departures which come within the spirit or scope of the invention.

We claim:

1. In combination, weighing mechanism, a conveyer for feeding articles one at a time to said mechanism to be weighed, a stop in position to block feed of an article from the conveyer to the weighing mechanism, and means jointly controlled by the article on the conveyer and by the weighing mechanism for releasing said stop to permit the article to be fed by the conveyer to the weighing mechanism.

2. In combination, weighing mechanism, a conveyer for feeding articles, one at a time to said mechanism to be weighed, a stop in position to block feed of an article to the weighing mechanism, means for releasing the stop to permit advance of the article to the mechanism, and a control effective when no load is on the mechanism for operating said means to cause release of the stop.

3. In combination, weighing mechanism, a conveyer for feeding articles, one at a time, to said mechanism to be weighed, releasable means for preventing feed of an article onto said mechanism, and a control governed by operation of the weighing mechanism for retarding release of said means while a previously applied article is still acting on said mechanism.

4. In combination, weighing mechanism, a conveyer for feeding articles, one at a time, to said mechanism to be weighed, a device for preventing feed of an article by said conveyer to said mechanism, electrical means for rendering said device ineffective, a circuit which, when closed, operates said electrical means to render said device ineffective, and a switch in said circuit closed when no load is on the mechanism and opened by said mechanism upon application of an article thereto.

5. The invention as defined in claim 4, and a second switch in said circuit closed by an article when the latter has been moved by the conveyer to a predetermined station just in advance of said mechanism to render the first-mentioned switch effective to close said circuit only when an article is at said predetermined station ready to be fed to the weighing mechanism.

6. In combination, weighing mechanism, to which packages are applied, one at a time, to be weighed, means for causing automatic ejection of the package from the mechanism, an electrical control for said means governed by operation of said mechanism according to the weight of the package, an electrical time delay relay for retarding the operation of said control until the mechanism has had time to come to rest under the weight of the package, a circuit for said relay, and a switch in said circuit closed by initial movement of said weighing mechanism to close said circuit for operating the relay thereafter independently of continued movement of said mechanism under the load of the applied package.

7. In combination, weighing mechanism for weighing articles, one at a time, means for causing automatic ejection of the package from the mechanism including an electrical control instrumentality for said means, a circuit for said control instrumentality including a pair of switches, both of which, when closed, complete said circuit, one of said switches being closed by operation of said mechanism when the article is of predetermined weight and the other of said switches being closed after the article has been applied to the mechanism for an interval sufficient to permit the mechanism to reach equilibrium, and delaying means set in operation by the application of the article to said mechanism for closing the latter switch when said interval has elapsed.

8. In combination, weighing mechanism for weighing packages, one at a time, means for causing automatic removal of the package from the mechanism, a control governed by operation of the mechanism for rendering said means effective to remove the package when the weight of the package is a prescribed amount, a signal for indicating that the package is not of the prescribed amount, and a delaying device for automatically retarding operation of said control and said signal for a short interval following the application of a package to said mechanism.

9. In combination, weighing mechanism for weighing packages one at a time, means for causing automatic removal of the package from the platform, a control for said means, a circuit for said control including a switch, closure of which establishes said circuit, a signal for indicating that the package is not of predetermined weight, a circuit for said signal including a second switch, closure of which establishes the signal circuit, and means controlled by operation of said mechanism for simultaneously closing the first switch and opening the second switch when the package is of predetermined weight and simultaneously opening the first switch and closing the second when the package is not of predetermined weight.

10. The combination as defined in claim 9, a third switch common to both said circuits and which must be closed to enable the other switches to complete their respective circuits, and delaying means for retarding closure of the third switch for a short interval following application of a package to said mechanism.

11. In combination, weighing mechanism for weighing articles, one at a time, means for automatically determining ejection of the article from the mechanism, and a control for said means including a control circuit therefor, a photo cell for governing operation of said circuit, and an element movable in response to operation of the mechanism from a non-cooperating position with respect to the photo cell to a field in which the element may cooperate with the photo cell for controlling operation of the cell and thereby the circuit according to whether the package is or is not of predetermined weight within a certain prescribed tolerance, and means for negativing effect of the photo cell on the circuit until the aforesaid element reaches said field of cooperation including a switch in said circuit, a time delay relay coil for closing said switch, and a circuit closed immediately by application of the article to the weighing mechanism for operating said coil.

12. In combination, weighing mechanism including a platform for receiving articles one at a time to be weighed, a stop for preventing eject movement of the article from the platform, and means for releasing said stop comprising an electrical device for removing said stop from the path of eject movement of the article, a circuit for said device, a photo cell for governing operation of the circuit, and a pointer operated by the weighing mechanism for controlling the photo cell according to whether the article is or is not of prescribed weights.

13. In combination; load weighing mechanism for weighing articles one at a time, a signal for indicating whether the article is of a certain weight, an electrical time delay relay, a switch open when no load is on the weighing mechanism, means connected to the weighing mechanism for causing said switch to close immediately upon application of the article load effecting an initial movement of the weighing mechanism from no load position, a circuit for said relay completed directly by closing of said switch to operate said relay for retarding operation of the signal for an interval following initial movement of the weighing mechanism and the application of the article load to the latter, a circuit for the signal, contacts in the signal circuit, and means controlled by the weighing mechanism in accordance with the load for determining closure of said contacts to complete the signal circuit after the delay interval.

LAWRENCE P. PENNELL.
WALTER F. STONE.
WILLIAM E. NAYLOR.